March 12, 1940. J. DOLZA 2,193,671
FLUID PRESSURE SYSTEM
Filed Dec. 1, 1937 2 Sheets-Sheet 2

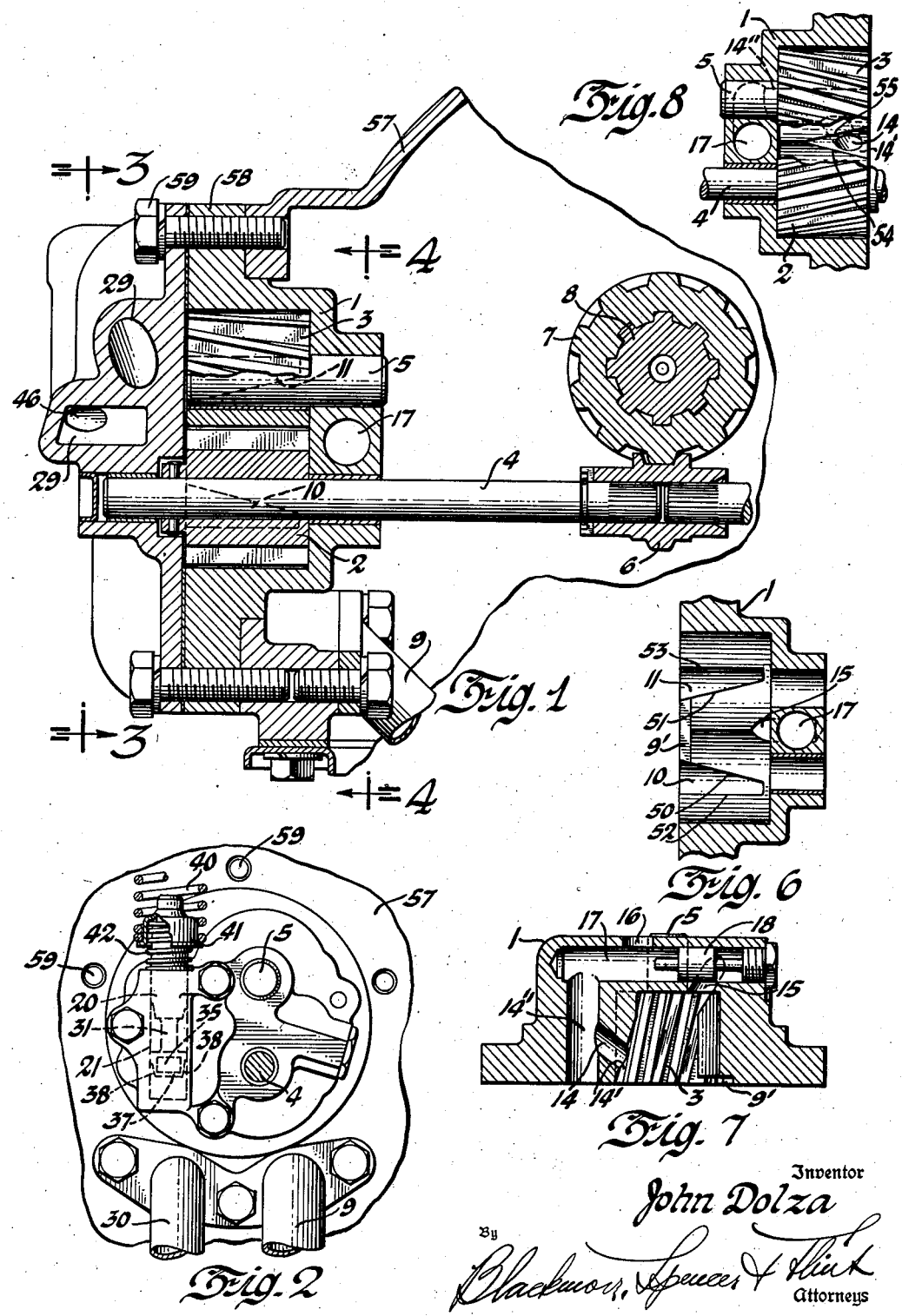

Inventor
John Dolza
By Blackmore, Spencer & Flint
Attorneys

Patented Mar. 12, 1940

2,193,671

UNITED STATES PATENT OFFICE 2,193,671

FLUID PRESSURE SYSTEM

John Dolza, Flint, Mich., assignor to General Motors Corporation, Detroit, Mich., a corporation of Delaware Application December 1, 1937, Serial No. 177,417

5 Claims. (Cl. 103—128)

This invention relates to a hydraulic system including a pump for the continuous delivery of fluid under pressure. It relates particularly to a fluid pressure system in which the fluid delivered by the pump is simultaneously used for different purposes for which the fluid pressure requirements are different.

More specifically it relates to a pumping arrangement for lubricating oil which is used both for the power servo movement of a device or devices requiring amplification of control motions and for the pressure lubrication of the parts of a mechanism.

One object of the invention is a fluid pressure system including a pump with means whereby the pump output is maintained substantially constant above a certain speed.

Another object of the invention is a pump of the gear wheel type which will deliver fluid with maximum efficiency to a main delivery duct at a requisite pressure in one direction of rotation of the gear wheels and at a lower but sufficient pressure in a reverse direction of rotation.

The above and other objects of the invention will be apparent as the description proceeds.

The drawings show the invention as it is applied for pressure lubrication and as a source of fluid under pressure for the operation of a device or devices actuated by fluid pressure.

In the drawings

Fig. 1 is an enlarged sectional elevation of the gear wheel pump.

Fig. 2 is an end view of the gear wheel pump.

Fig. 6 is a view of a part of Fig. 1 to a reduced scale, with the pump gears removed to show the inlet ports 10 and 11.

Fig. 7 is a view on line 7—7 of Fig. 4 showing the forward and reverse delivery ports.

Fig. 8 is a view on line 8—8 of Fig. 4 with the pump gears broken away to show the forward delivery port.

As illustrated, the invention is intended to be used in conjunction with the lubrication and control of elements such as clutches and brakes or other power actuated devices in an automatic transmission for an automobile, as an example.

Figure 3:
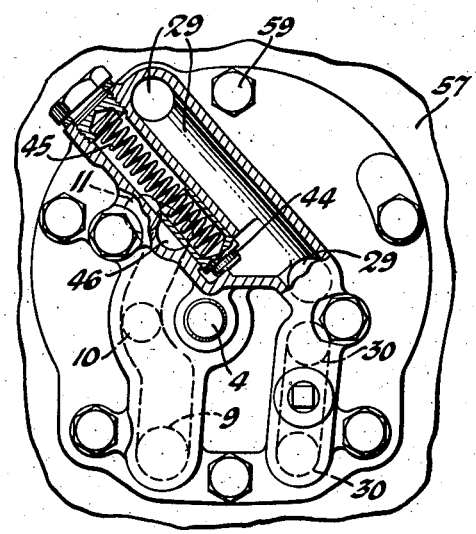
Fig. 3 is a view on line 3—3 of Fig. 1.
Figure 4:
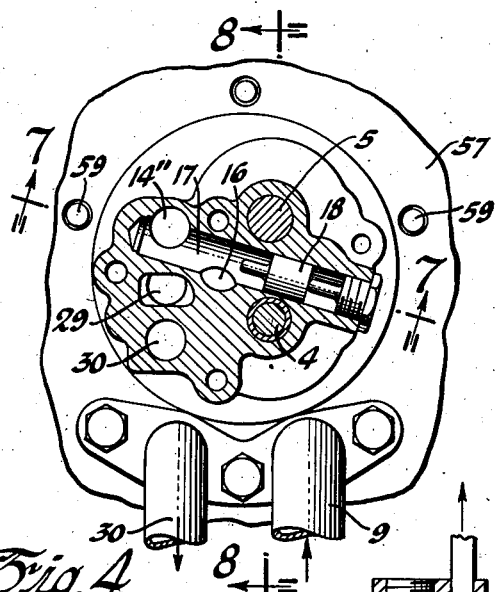
Fig. 4 is a view on line 4—4 of Fig. 1.
Figure 5:
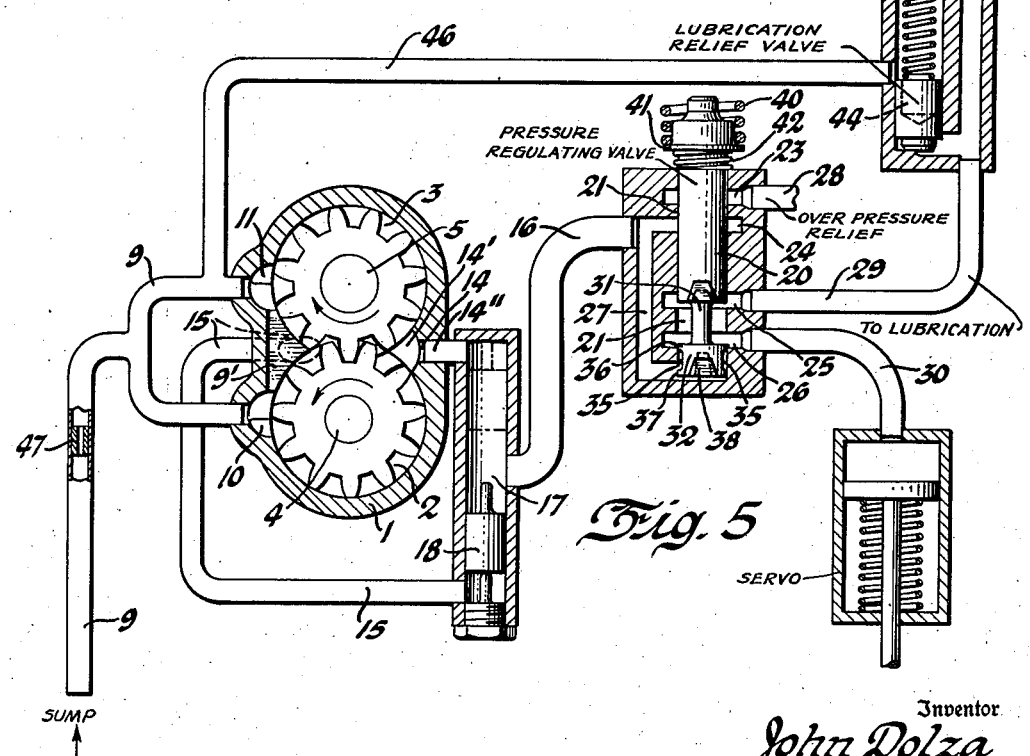
Fig. 5 is a diagrammatic view of the pump and associated parts.

Within the pump housing 1, are the two gear wheels 2 and 3, mounted on shafts 4 and 5 respectively. The shaft 4 is the driving shaft which is driven in either direction through the helical gears 6 and 7, from the shaft 8. In the example illustrated, shaft 8 is the transmission driven shaft of an automobile; it rotates in one direction during forward movement of the automobile and in an opposite direction during reverse movement of the automobile. As shown in Fig. 5, the shaft 4 rotates anti-clockwise during forward movement and clockwise during reverse movement of the automobile.

Lubricating oil from a sump (not shown), is drawn into the pump through a main inlet duct 9 which opens into the gear chamber of the pump housing 1, through two inlet ports 10 and 11 at points which are disposed at the periphery of each gear wheel, comparatively close to their meshing zone on one side of the plane of their axes.

In the normal forward rotation of the gear wheels 2 and 3, the delivery outlet is through a port 14 at the meshing zone of the gears on that side of the plane of their axes opposite to the inlet ports 10 and 11.

In the reverse direction of rotation of the gear wheels 2 and 3 the delivery outlet is through a port 15 at the meshing zone of the gears on the same side of the plane of their axes as the inlet ports 10 and 11.

The two delivery ports 14 and 15 are connected to a main delivery duct 16 through a valve chamber 17 containing a shuttle valve 18 of plug form, which is forced by fluid pressure to one end or the other of the valve chamber 17, to close off the port 15 from the duct 16 and to open the port 14 to the duct 16 and vice versa, accordingly as the gear wheels are rotating in a forward direction and delivering through the port 14 or in a reverse direction and delivering through the port 15.

The duct 16 carries the lubricating oil under pressure to a differential pressure distributing and regulating valve which, in the example, is a spring loaded plunger 20 slidable in a bore 21. The bore 21 is provided with four axially spaced annular grooves 23, 24, 25, and 26, constituting ports which are opened and closed by control lands of the plunger 20.

The duct 16 is in open communication with the groove 24, and with the bottom of the bore 21, through a duct 27. The grooves 23, 25, and 26, are respectively in open communication with an over pressure relief duct 28, a duct 29 for oil under pressure for lubricating purposes, and a duct 30 leading to the power cylinder or cylinders of the servo actuated devices.

The lubricating system connected to the duct 29 is a through flow circuit with return to the sump, while the servo system connected to the duct 30 is a closed system without any through flow circuit.

The plunger 20 has a portion 31 of reduced diameter separating a part 32 from the main portion of the plunger. At diametrically opposite sides of the periphery of the part 32 of the plunger there are notches 35 leaving rims 36 and 37 on the part 32 which have a diameter equal to the bore 21. At diametrically opposite points between the notches 35 are notches 38 open to the space below the plunger and tapering smaller away therefrom.

Fig. 5 shows the position of the plunger 20 when the pump is not running and there is no pressure in the main delivery duct 16. It will be noted that the plunger is resiliently urged to the position shown, by a suitable spring such as 40 bearing on a seating 41 on the plunger. The pressure of the spring 40 may be adjustable in any suitable way. A spring 42 below the seating 41 opposes the spring 40 to a lessening extent as the plunger 20 rises in the bore 21 to make the plunger more sensitive to lower pressure changes; the spring 42 is inoperative at higher pressure.

In the position of the plunger 20 shown in Fig. 5, the grooves 25 and 26 are cut off from communication with the duct 27 by the rim 36. However, immediately the pump is in operation and there is sufficient pressure in the ducts 16 and 27, the plunger is lifted against the net pressure of springs 40 and 42 by the pressure on the bottom end of the part 32 of the plunger, the rim 36 is no longer effective to seal the grooves 25 and 26 from the duct 27, and there is a restricted path over the rim 37 through the notches 35 and over the rim 36, and a gradually increasing path through the tapered notches 38, for the flow of oil into the grooves 25 and 26 and thence to a gradually increasing degree to the ducts 29 and 30.

As the pressure in the duct 16 increases with increasing speed of the pump gears 2 and 3, the plunger is lifted still further to a position in which the part 32 is clear of the groove 26, permitting unrestricted flow of oil into the duct 30 to the servo system, and a restricted path for the flow of oil through the notches 38 into the groove 25 and thence to the duct 29 for lubricating purposes.

As and when the demands of the servo system are satisfied by the displacement of the plungers in their cylinders or their equivalents, it will be appreciated that the delivery from the pump will be in excess of the quantity which can pass through the notches 38 into the grooves 25 and thence to the duct 29 for lubricating purposes; when this occurs the plunger 20 will be lifted clear of the grooves 26 and 25 to a position in which the portion 31 of reduced diameter is opposite the grooves 24 and 23, thereby opening the duct 16 to the pressure relief duct 28.

In the condition when the plunger 20 of the differential pressure distributing and regulating valve is lifted clear of the grooves 26 and 25, it will be appreciated that there is comparatively unrestricted flow of oil not only to the duct 30 of the servo system but also to the duct 29 for lubricating purposes and that the restricted passageway through the notches 38 is inoperative to reduce the pressure in the duct 29. Especially for this condition and in order to limit the pressure in the duct 29 for lubricating purposes to a desired maximum, a relief valve 44 loaded by a spring 45 is provided in a bypass duct 46 from the duct 29 directly to the main inlet duct 9 at a point between a restricted passage 47 in the inlet duct 9 and the inlet ports 10, 11.

The restriction 47 offers increasing resistance to the flow of oil from the sump to the inlet ports at higher speeds and is of such dimensions that, in conjunction with the quantity of oil returned through the bypass duct 46 directly to the inlet ports at the higher speeds, the pump output is maintained substantially constant above a certain speed; this prevents overloading at the higher speeds.

It will be seen that the differential pressure distributing and regulating valve plunger 20 is effective to limit the maximum pressure in either of the ducts 29 or 30 by opening the relief duct 28; that the maximum pressure in the duct 29 is limited by the relief valve 44; and that together the valve plunger 20 and the valve 44 may, with suitable spring loading, be arranged to provide for any desired pressure differential between a maximum in duct 30 and a lower maximum pressure in duct 29. For example, the springs 40 and 42 may be arranged to provide for a maximum pressure of 80 lbs. per square inch in the duct 30 and the servo system, and the spring 45 may be arranged to provide for a maximum pressure of 20 lbs. per square inch in the duct 29 and the lubricating system.

In the example illustrated, the power servo movement of the control devices is not required during reverse movement of the automobile, and hence during reverse rotation of the shaft 4 and the pump gear wheels 2 and 3, the pump is required only to deliver oil through the duct 29 at the lower pressure required for lubricating purposes. It is for this reason that the inlet ports 10 and 11 are disposed as far as possible from the forward delivery port 14, in order to provide the longest possible sealing arcs around the tips of a maximum number of teeth of the gear wheels between these ports, for minimum pressure drop between adjacent teeth and maximum efficiency of the pump in forward rotation, so that it is able to develop and sustain the higher maximum pressure requisite for operation of the servo devices during forward rotation, while still being capable of providing the lesser requisite pressure for lubricating purposes during reverse operation.

In order to provide for continuity of discharge and to reduce noise, the pump gear wheel teeth are helical. The helical gears have the further advantage that, with suitably disposed porting there will be a maximum number of teeth to effect a seal between the ports, and in conjunction with a reverse delivery port at that end of the inlet port side of the meshing zone of the gears remote from the end where the duct 9 opens to the inlet ports 10 and 11, the pumping spaces between the teeth of each gear as they pass between their respective inlets and the reverse delivery port in reverse rotation, can be sealed from the inlet.

Referring now especially to Figs. 1, 6, and 7. the inlet ports 10 and 11 extend substantially the length of the gears and are connected together by an inlet relief space 9' (shown most clearly in Fig. 6), at the inlet end of the inlet ports 10 and 11.

The edges 50 and 51 of the inlet ports 10 and 11 are leading edges in forward rotation, and are inclined at the same angle as the helical angle of the gears 2 and 3 which have respectively left and right hand helices. The trailing edges 52 and 53 are parallel with the axes of the gears.

It will be appreciated that the inclined edges 50 and 51 of the inlet ports are the trailing edges in reverse rotation, and that since they are inclined at the same angle as the teeth of the gears, the spaces between the teeth of each gear are sealed from their respective inlet ports along their whole length as they pass during reverse rotation beyond these inclined edges towards their meshing zone.

As shown in Figs. 7 and 8, the forward delivery port 14 is on the opposite side of the meshing zone of the gears from the inlet ports and towards that end of the meshing zone towards which the point of contact of the helical gear teeth moves in forward rotation. It is open to the meshing zone of the gears through a relief space 14' through which there is an outlet to the port 14 from the space between any pair of teeth immediately the teeth begin to mesh at the opposite end of the gears. The edges 54 and 55 of the relief space 14' are substantially parallel to the helical teeth of the gears by which they are swept. A duct 14" connects the port 14 with the valve chamber 17.

As shown in Figs. 6 and 7, the reverse delivery port 15 opens from that end of the inlet port side of the meshing zone of the gears remote from the inlet relief space 9' (i. e. from the opposite end and the opposite side of the meshing zone of the gears from the forward delivery port 14).

Actually the inlet ports 10 and 11 are spaced on either side of the reverse delivery port 15 a minimum circumferential distance equal to the pitch of the teeth of the gears so that there is, at all times, a seal of one tooth between the inlet ports and the reverse delivery port.

It will be noted that the "hand" of the helical gears is such that in both forward and reverse rotation, fluid is squeezed by the helical teeth towards the respective delivery ports, as the point of contact of the helical gear teeth moves longitudinally along the meshing zone from left to right in forward rotation in Fig. 8 and in reverse rotation in Figs. 1 and 6.

The reverse delivery port is, of course, so dimensioned that there is an outlet therethrough from the space between any pair of teeth immediately the teeth begin to mesh and close off the relief space 9', at the end opposite to the delivery port.

In forward rotation of the gears 2 and 3 there is gradual filling of the tooth spaces through the relief space 9', and a gradual cut off as the helical teeth pass over the longitudinal trailing cut off edges 52 and 53 of the ports 10 and 11.

In reverse rotation there is gradual filling of the teeth spaces as the helical teeth pass over the longitudinal edges 52 and 53 of the ports 10 and 11, and a gradual cut off as the teeth of the gears close off the relief space 9' in meshing first at that end of the meshing zone.

It will be appreciated that in forward rotation, the relief space 9' gradually relieves the vacuum which would otherwise occur in the tooth spaces and that this, in conjunction with the long arc of seal around the gears, provides for the desired maximum efficiency in forward rotation. Furthermore the gradual filling and cut off of the tooth spaces, provided for in either direction of rotation, effectively reduces or prevents pumping noises.

The pump housing 1 complete with all the parts described, is contained within the automobile transmission casing 57. It is provided with a flange 58 which is bolted by bolts such as 59 to a facing on the outside wall of the transmission casing with the pump housing extending thereinto. The whole assembly including the pump driving shaft 4 with its gear 7 can be slid into mesh with the gear 7 on the shaft 8 of the transmission or can be removed from the transmission casing in one unit.

I claim:

1. In a reversible gear wheel pump designed for maximum efficiency in a forward direction of rotation and a lesser efficiency in a reverse direction of rotation, a pair of intermeshing helical gear wheels, a pair of inlet ports, one for each gear, disposed at the peripheries and extending longitudinally of the gears on one side of the plane of their axes and comparatively close to their meshing zone, a forward delivery port in the meshing zone on the opposite side of the plane of the axes of the gears, a reverse delivery port on the inlet port side of the plane of the axes of the gears, and at that end of the meshing zone towards which the point of contact of the helical gear teeth moves in reverse rotation, and an inlet relief space interconnecting the inlet ports and open to that end of the meshing zone remote from the reverse delivery port to relieve the vacuum which would otherwise occur in the tooth spaces in forward rotation.

2. The combination according to claim 1 in which the inlet ports are spaced from the reverse delivery port a minimum circumferential distance equal to the pitch of the teeth of the gears, to provide a minimum seal of one tooth between the inlet ports and the reverse delivery port.

3. In a gear wheel pump, a pair of intermeshing helical gear wheels, means for driving the gears in a forward or reverse direction, a pair of inlet ports, one for each gear, extending substantially the length of the gears on one side of the plane of their axes and comparatively close to their meshing zone, a forward delivery port in the meshing zone on the opposite side of the plane of the axes of the gears, and a reverse delivery port at one end of the meshing zone of the gears on the same side of the plane of their axes as the inlet ports; those edges of said inlet ports adjacent to the meshing zone being substantially parallel to the helical teeth of the gears by which they are swept, and those edges of the inlet ports remote from the meshing zone being substantially parallel with the axes of the gears, the reverse delivery port being at that end of the meshing zone towards which the inlet ports narrow.

4. The combination according to claim 3, in which the forward delivery port is towards that end of the meshing zone towards which the point of contact of the helical gear teeth moves longitudinally along the meshing zone.

5. The combination according to claim 3, in which there is an inlet relief space interconnecting the inlet ports and open to the meshing zone at that end of the inlet ports opposite to the reverse delivery port, to relieve the vacuum which would otherwise occur in the tooth spaces in forward rotation.

JOHN DOLZA.